Aug. 19, 1952  A. A. ANDREWS  2,607,398
COMBINED STOOL AND FISHING ROD SUPPORT
Filed Sept. 22, 1947
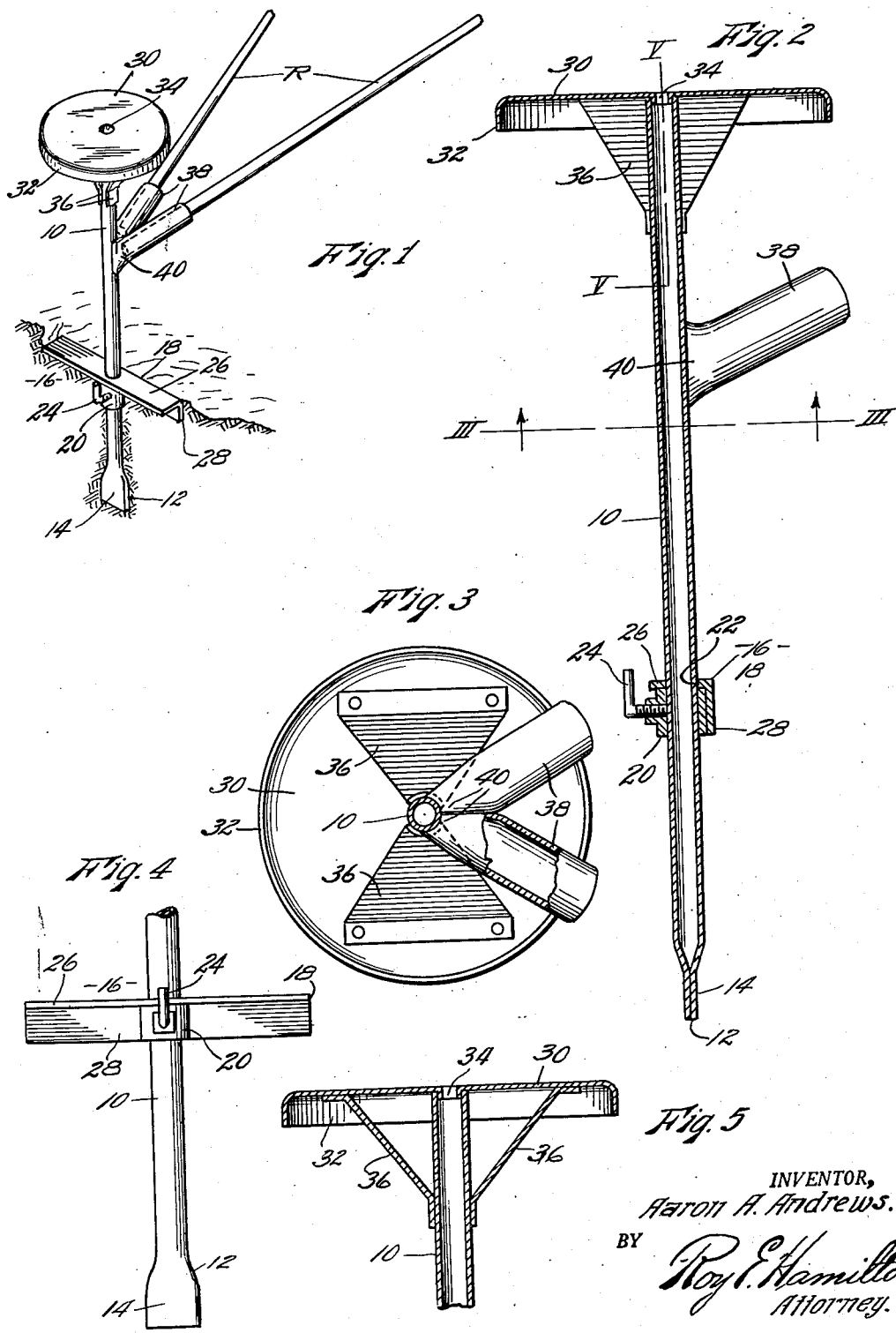
INVENTOR,
Aaron A. Andrews.
BY
Roy E. Hamilton,
Attorney.

Patented Aug. 19, 1952

2,607,398

UNITED STATES PATENT OFFICE 2,607,398

COMBINED STOOL AND FISHING ROD SUPPORT

Aaron A. Andrews, Harris, Kans.

Application September 22, 1947, Serial No. 775,453

2 Claims. (Cl. 155—134)

This invention relates to a combined stool and fishing rod support which is adapted for use by a fisherman when fishing from the shore.

More particularly it is the object of this invention to provide a device which may be easily and quickly positioned in the earth to support a seat and to provide a plurality of sockets for supporting fishing rods in the operative position to avoid the necessity of having to lay the rod down on the shore.

Another object of the invention is the provision of a combined seat and a fishing rod support whereby the fisherman may more conveniently fish from the bank with a plurality of fishing rods.

Other objects are simplicity and economy of construction, ease and efficiency of operation, and adaptability for use in various types of earth structures.

With these objects in view as well as other objects which will appear during the course of the specification, reference will be had to the drawing wherein:

Figure 1 is a perspective view of a combined stool and fishing rod support, shown in the operating position, embodying this invention.

Fig. 2 is an enlarged vertical section taken through the center of the standard.

Fig. 3 is an inverted sectional view taken on line III—III of Fig. 2.

Fig. 4 is a fragmentary elevational view showing the lower end portion of the standard and the cross bar.

Fig. 5 is a sectional view on line V—V of Fig. 2.

Throughout the several views like reference characters refer to similar parts and the numeral 10 designates a standard made of any suitable material such as a metal tube, open at its upper end and pressed together at its lower end at 12 to present a sharpened edge to facilitate easy pressing into the earth and to present a broad section 14 to prevent transverse movement of the lower end of the standard as hereinafter set forth.

A cross bar 16 comprising a length of angle iron 18 having a sleeve 20 welded or otherwise secured in the angle of the angle iron adjacent its central portion is provided with a vertical hole 22 therethrough whereby it is slidably mounted on the standard 10. When this cross bar is properly positioned it may be secured in position by the set screw 24. It is intended that this cross bar shall serve as a depth gauge for limiting the inserting of the standard in the ground and also to serve to prevent transverse tilting of the standard. It is quite evident that the horizoltal leg 26 of the angle iron serves as a depth gauge, while the vertical leg 28 serves to prevent forward tilting of the standard as the leg 26 serves to preclude side tilting.

A seat 30 of disc shape having a rolled edge 32 and an axially disposed center sleeve 34 is securely fastened to standard 10 with the sleeve 34 fitted into the upper end of standard and with a pair of diametrically opposed diagonal braces 36, spot welded at their upper extremities to the under side of the seat and at their lower extremities to the standard. The shape of this seat might vary, also its method of mounting might be changed without departing from the spirit of the invention.

Upwardly and outwardly diverging fishing rod receiving sockets 38 comprise sections of tubing pinched together at their one end 40 and welded to the standard intermediate seat 30 and cross bar 16. It will be noted that these sockets are relatively outwardly diverging so that there will be no interference between the fishing rods R and the lines. Any number of sockets may be provided from one to several. However, it is desirable to set the sockets so that they will extend forwardly of the cross bar 16 as shown.

The broad side 14 of the standard is shown as being in substantially parallel relation with the face of leg 28 of the angle iron, thus presenting a surface to resist backward or forward tilting of the standard.

This stool may be adjusted to any desired height above the ground level and may also be tilted to any desired angle to the horizontal to meet the needs of the fisherman.

What I claim as new and desire to protect by Letters Patent is:

1. A combined stool and fishing rod support, comprising a tubular standard flattened at its lower end portion, a seat secured to the upper end of said standard, angled braces joining said seat to the standard, a depth gauge adjustably mounted on said standard, said depth gauge comprising an elongated planar horizontal member having a vertically disposed longitudinal flange parallel to the flattened portion of said standard, means for securing said depth gauge to said standard, and a plurality of fishing rod sockets fixed to said standard above said depth gauge and extending upwardly and outwardly therefrom.

2. A combined stool and fishing rod support, comprising a tubular standard flattened at its lower end portion, a circular seat secured at its central portion to the upper end of said standard, angled braces joining said seat to the standard, a depth gauge adjustably mounted on said standard to limit the insertion of said standard in the earth, said depth gauge comprising an elongated planar horizontal member having a vertically disposed longitudinal flange parallel with the flattened portion of said standard, means for securing said depth gauge to said standard, and a plurality of fishing rod sockets fixed to said standard above said depth gauge and extending upwardly and outwardly therefrom transversely to the planes of said flattened standard portion and said vertical flange.

AARON A. ANDREWS.

REFERENCES CITED

The following references are of record in the file of this patent:

UNITED STATES PATENTS

| Number | Name | Date |
|---|---|---|
| 401,302 | Purdy | Apr. 9, 1889 |
| 1,423,612 | Jewett | July 25, 1922 |
| 1,719,695 | Ferguson | July 2, 1929 |
| 1,737,151 | Derbyshire | Nov. 26, 1929 |
| 1,956,956 | Leibo | May 1, 1934 |
| 2,139,826 | Huntly | Dec. 13, 1938 |